(12) United States Patent
Leffler et al.

(10) Patent No.: US 10,029,719 B2
(45) Date of Patent: Jul. 24, 2018

(54) FOLDABLE UTILITY CART

(71) Applicant: Inventus Holdings, LLC, Juno Beach, FL (US)

(72) Inventors: Kyle Seth Leffler, Tehachapi, CA (US); Christopher Charles Fluharty, Sterling, CO (US)

(73) Assignee: Inventus Holdings, LLC, Juno Beach, FL (US)

( * ) Notice: Subject to any disclaimer, the term of this patent is extended or adjusted under 35 U.S.C. 154(b) by 0 days.

(21) Appl. No.: 15/357,318

(22) Filed: Nov. 21, 2016

(65) Prior Publication Data

US 2018/0141576 A1    May 24, 2018

(51) Int. Cl.
| | |
|---|---|
| *B62B 3/00* | (2006.01) |
| *B62B 3/02* | (2006.01) |
| *B62B 5/00* | (2006.01) |
| *B62B 5/04* | (2006.01) |

(52) U.S. Cl.
CPC .............. *B62B 3/025* (2013.01); *B62B 3/002* (2013.01); *B62B 5/0063* (2013.01); *B62B 5/0485* (2013.01); *B62B 2205/24* (2013.01)

(58) Field of Classification Search
CPC ........... B62B 3/025; B62B 3/002; B62B 3/02; B62B 5/0063; B62B 5/00; B62B 5/0006; B62B 2205/24

See application file for complete search history.

(56) References Cited

U.S. PATENT DOCUMENTS

| | | | | |
|---|---|---|---|---|
| 2,950,126 | A * | 8/1960 | Armentrout | B60P 3/073 410/66 |
| 3,464,715 | A * | 9/1969 | Anderson | B62B 3/002 280/651 |
| 6,471,309 | B1 * | 10/2002 | Turner | A47B 53/02 211/162 |
| 6,733,026 | B1 * | 5/2004 | Robberson | B62B 3/02 280/30 |
| 6,860,494 | B1 * | 3/2005 | Chisholm | B62B 30/02 280/47.19 |
| 7,484,631 | B2 * | 2/2009 | Bothun | A47B 53/02 211/162 |
| 8,291,829 | B1 * | 10/2012 | Dunlavy | B61B 10/04 104/120 |
| 2005/0132924 | A1 * | 6/2005 | Bothun | A47B 53/02 104/307 |
| 2010/0072730 | A1 * | 3/2010 | Shapiro | B62B 3/007 280/639 |
| 2010/0109268 | A1 * | 5/2010 | Koehler | B62B 3/008 280/33.991 |
| 2015/0129573 | A1 * | 5/2015 | Traver | B23K 37/0211 219/138 |
| 2017/0276121 | A1 * | 9/2017 | Mogensen | F03D 13/10 |

* cited by examiner

*Primary Examiner* — Brian L Swenson
(74) *Attorney, Agent, or Firm* — Jon Gibbons; Fleit Gibbons Gutman Bongini & Bianco P.L.

(57) ABSTRACT

A foldable utility cart is lightweight and easily conveyed up and down a wind turbine for transporting parts and tools used for repair and maintenance of a wind turbine. A set of wheels allow the cart to be easily rolled along the nacelle and an attachment bar secures the cart to a guidance rail.

20 Claims, 17 Drawing Sheets

308 – FALLING OBJECT
281 – MOTOR VEHICLE
214 – DAMAGED/BROKEN EQUIPMENT
203 – SLIP/TRIP/FALL ON LEVEL
109 – ANIMAL – OTHER THAN DOG
83 – HOUSEKEEPING
63 – INSECT
60 – SLIP/TRIP/FALL FROM HEIGHT
57 – LADDER/STAIRWAY/SCAFFOLD
56 – TOOLS

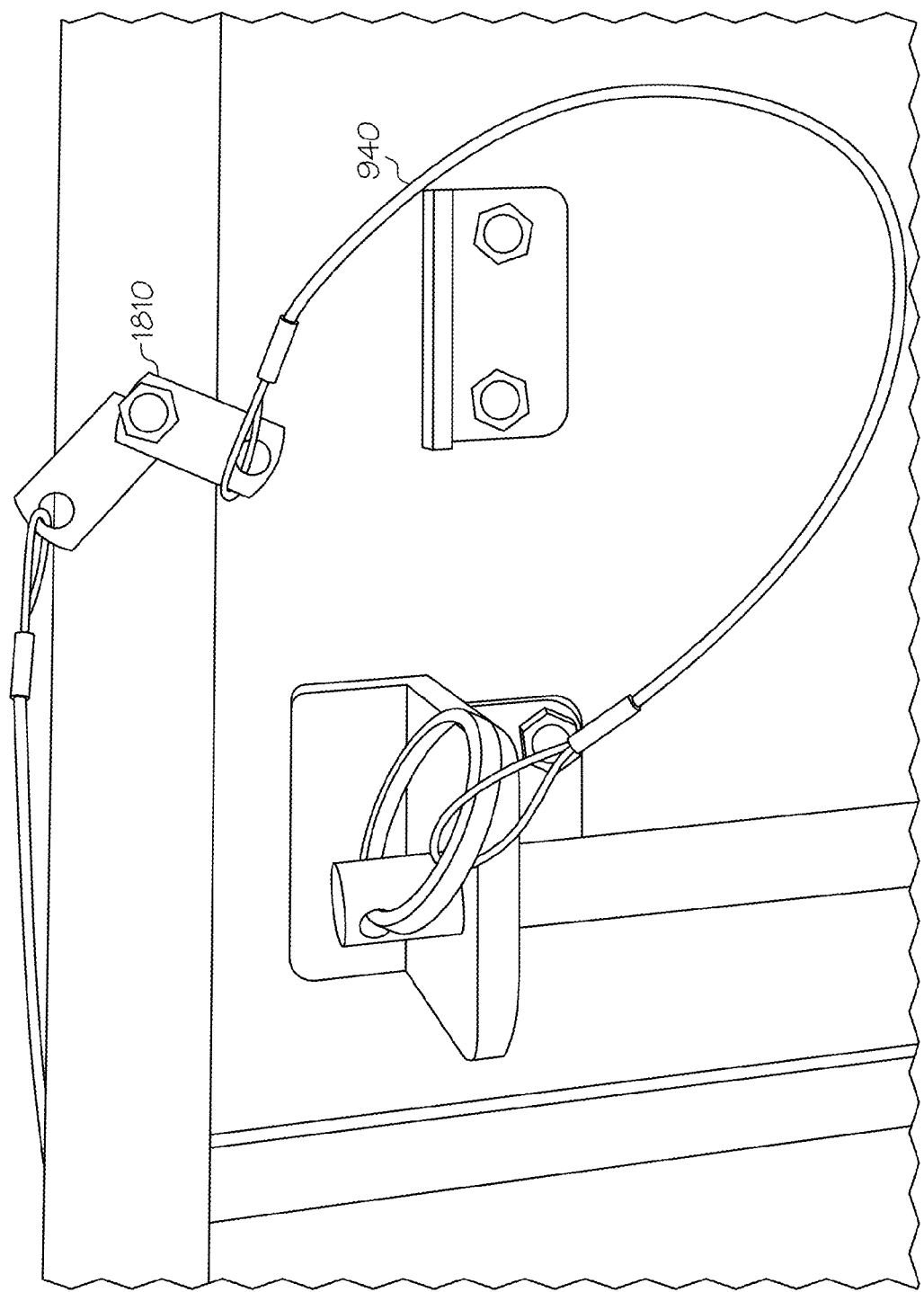

FOLDABLE UTILITY CART

FIELD OF THE DISCLOSURE

The present disclosure generally relates to containment devices, and more particularly to containment devices for transporting objects in high risk environments.

BACKGROUND

Wind turbines harness the power of wind flow to generate electricity. "Wind energy" as it is sometimes called, is clean energy, meaning that it is non-polluting and renewable. Industrial wind turbines are often grouped together as part of a wind farm, generating bulk electrical power for multiple consumers. Industrial wind turbines are quite large, reaching heights exceeding 300 feet. Referring now to FIG. 1, there is shown a simplified illustration of a wind turbine 100 that might be part of a wind farm, according to the known art. Air flow turns the blades 160 connected to a shaft (not shown) located in the hub 140. The shaft connects to a generator housed in the nacelle 120 to make electricity. An aerodynamically shaped nose cone 145 surrounds the hub 140. The nacelle 120 is supported by the tower 110. The height of a tower can be upwards of 200 feet.

Regular maintenance and repairs must be performed on the wind turbine 100, generally in the area of the hub 140. Potential injury exists when transporting tools and parts between the nacelle 120 and the nose cone 145, where the blades 160 are attached. Soft-sided tool bags are often used for hauling tools because they not only hold bulky tools but are collapsible, allowing for easier hauling of an empty tool bag up and down a latter structure within the tower 110 of the wind turbine 100. Currently technicians must make numerous transitions between the nacelle 120 and hub 140, using a tool bag to transport tools and parts weighing up to 50 lbs. FIG. 2 shows a worker carrying a tool bag 240 atop the wind turbine nacelle 120, walking on a path 224 along the nacelle 120 to reach the hub 140. The worker shown in FIG. 2 is wearing a harness 250 secured to a safety rail or guide rail 222 by a rope 226 for securing human movement atop the wind turbine nacelle. The safety rail 222 runs along the length of the nacelle 120.

The tool bags 240 cannot be loaded to the point where they become too heavy and unwieldy for one worker, thus limiting their load weight to what one worker can safely carry. Workers must make several trips up and down the wind turbine 100 and back and forth across the nacelle 120 to transport the necessary equipment.

Referring now to FIG. 3, there is shown a pie chart 300 with a breakdown of the top ten near miss/unsafe conditions recorded by event category during a one-year period in 2015 for a wind fleet manufacturer. As the pie chart 300 shows, five of the top ten events can occur during transitions: falling object; damaged/broken equipment; slip/trip/fall on level; slip/trip/fall from height; and tools. A transition is the movement from the nacelle 120 to the hub 140 which is accessed by personnel walking across the nose cone 145.

Many of the recorded injuries occur during the transition between the nacelle 120 and the hub 140. It is difficult, time-consuming and potentially unsafe to carry tools and parts from the nacelle 120 to the hub 140 because of the potential for a slip or fall when making numerous transitions from the nacelle 120 and hub 140. Currently, transporting tools and parts between the nacelle 120 and hub 140 requires making multiple difficult transitions.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 18 shows a zoomed-in view of the pin-clip fastener, according to an embodiment of the present disclosure.

DETAILED DESCRIPTION

As required, detailed embodiments are disclosed herein; however, it is to be understood that the disclosed embodiments are merely examples to show the utility of the transporter. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Figure 4:
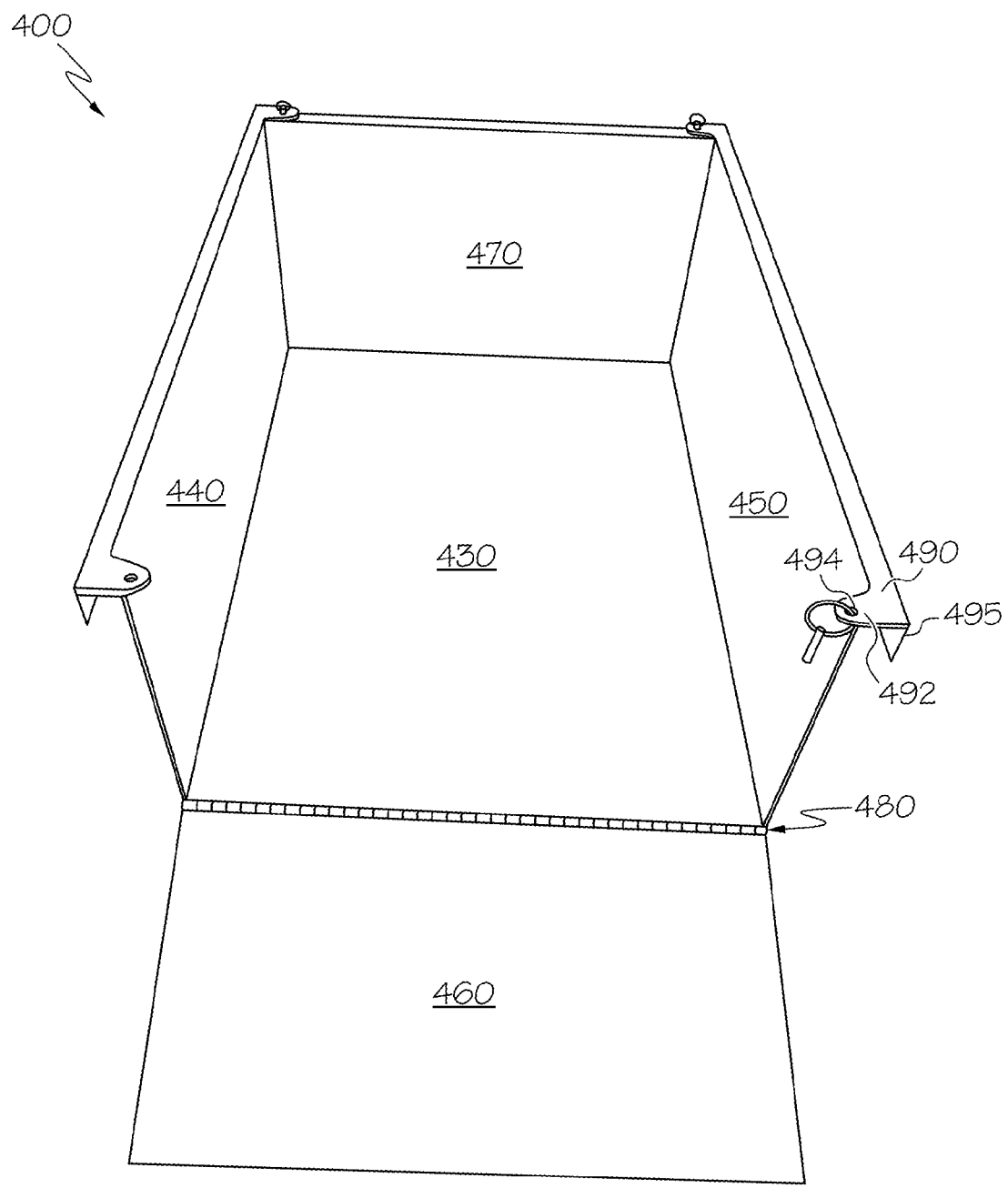
FIG. 4 shows an empty utility cart with one side collapsed, according to an embodiment of the present disclosure.

Referring now to FIG. 4, there is shown an illustration of a collapsible, wheeled utility cart 400, according to an embodiment of the disclosure. The utility cart 400 of FIG. 4 is shown in a partially assembled state. The utility cart 400 can be used to transport tools and equipment for work performed in environments such as wind farms. The utility cart 400 is easily collapsible into a compact form factor, rust-proof, has no sharp edges or loose parts, and is lightweight; making it ideal for use in a wide variety of industries, including energy, ocean, and aerospace industries, to name a few. The examples and embodiments, although directed to the wind energy industry, should not be taken to limit the invention to that industry.

Figure 1:
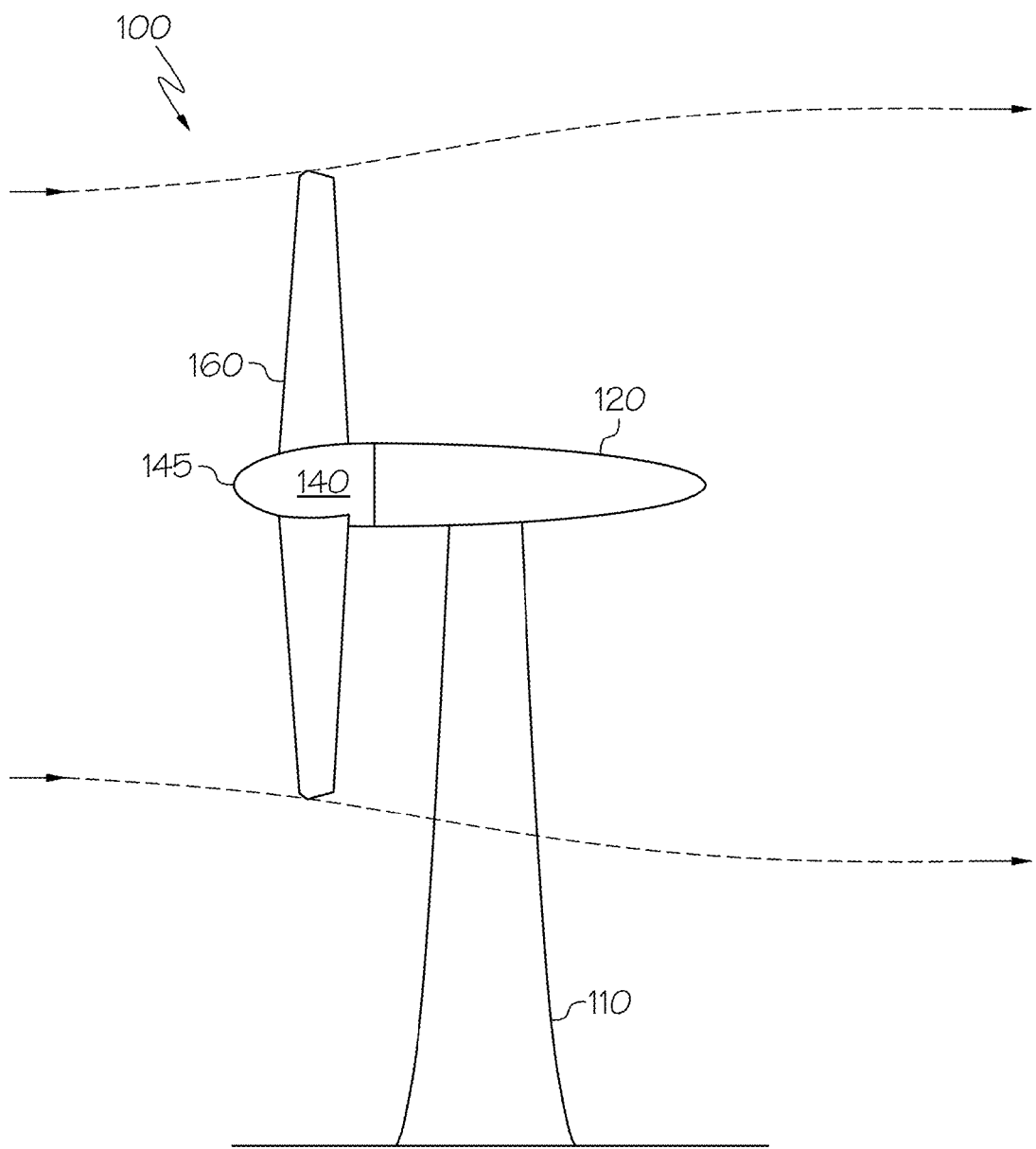
FIG. 1 is a simplified illustration of a wind turbine, according to the known art.
Figure 2:
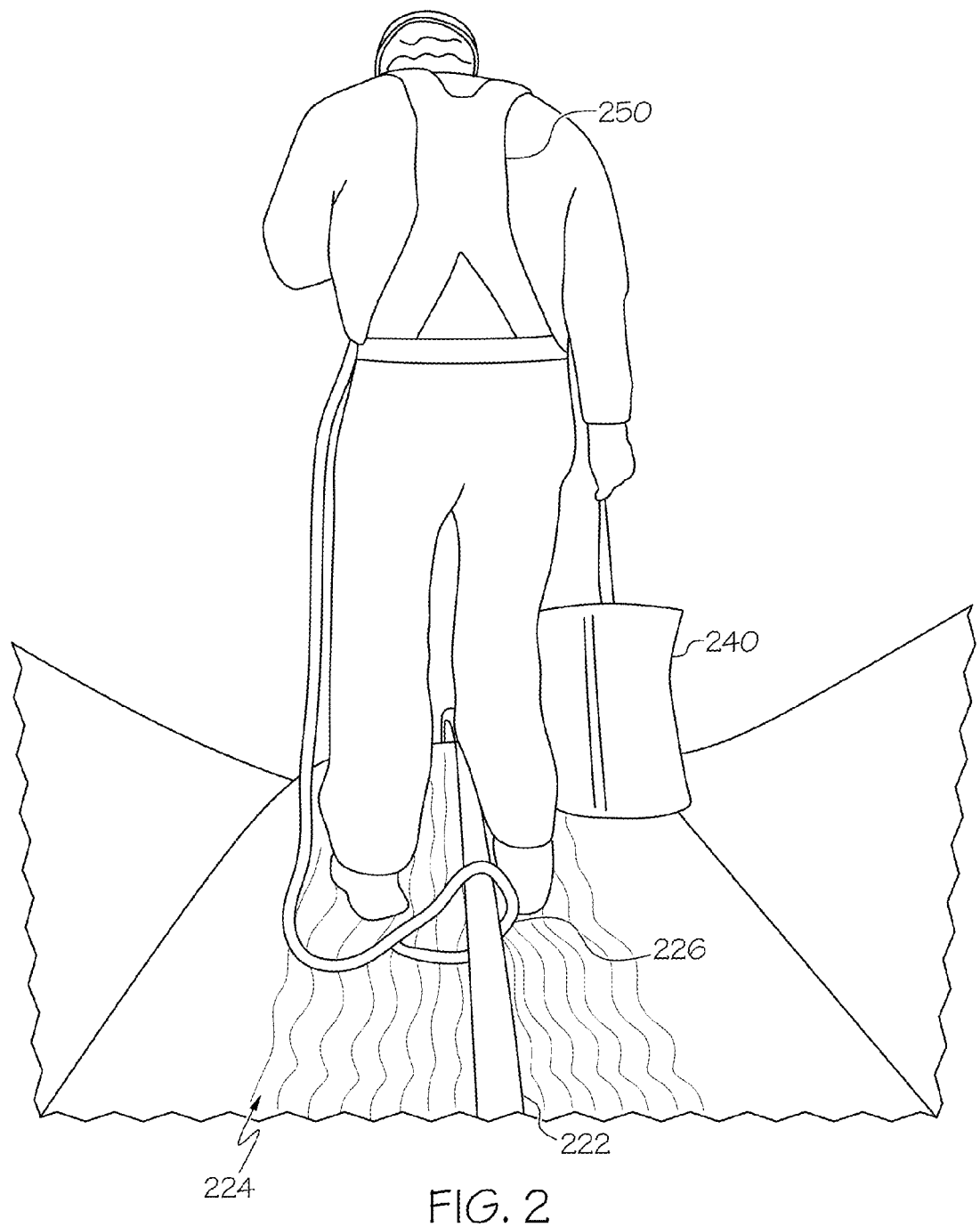
FIG. 2 shows a wind fleet worker carrying a bag of tools from the nacelle to the hub, according to the known art.
Figure 3:
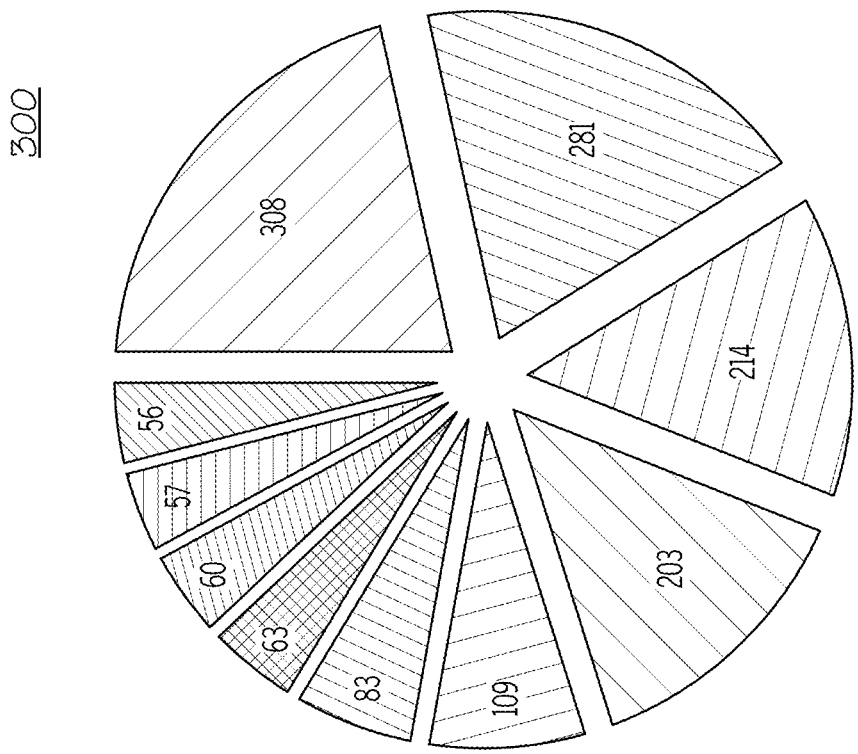
FIG. 3 shows a pie chart with a breakdown of near miss/unsafe conditions by event category in one year, according to the known art.

In the wind energy industry the utility cart 400 can replace the tool bags 240 currently in use. Because the utility cart 400 is larger, having more storage capacity than the average tool bag 240 and moves easily on wheels, it can be used to haul a heavier load needed for repair and maintenance of industrial machinery, such as the wind turbine 100 shown in FIG. 1. This reduces the number of transitions required for repair and maintenance of machinery as well as reduces unsafe worker conditions.

Figure 8:
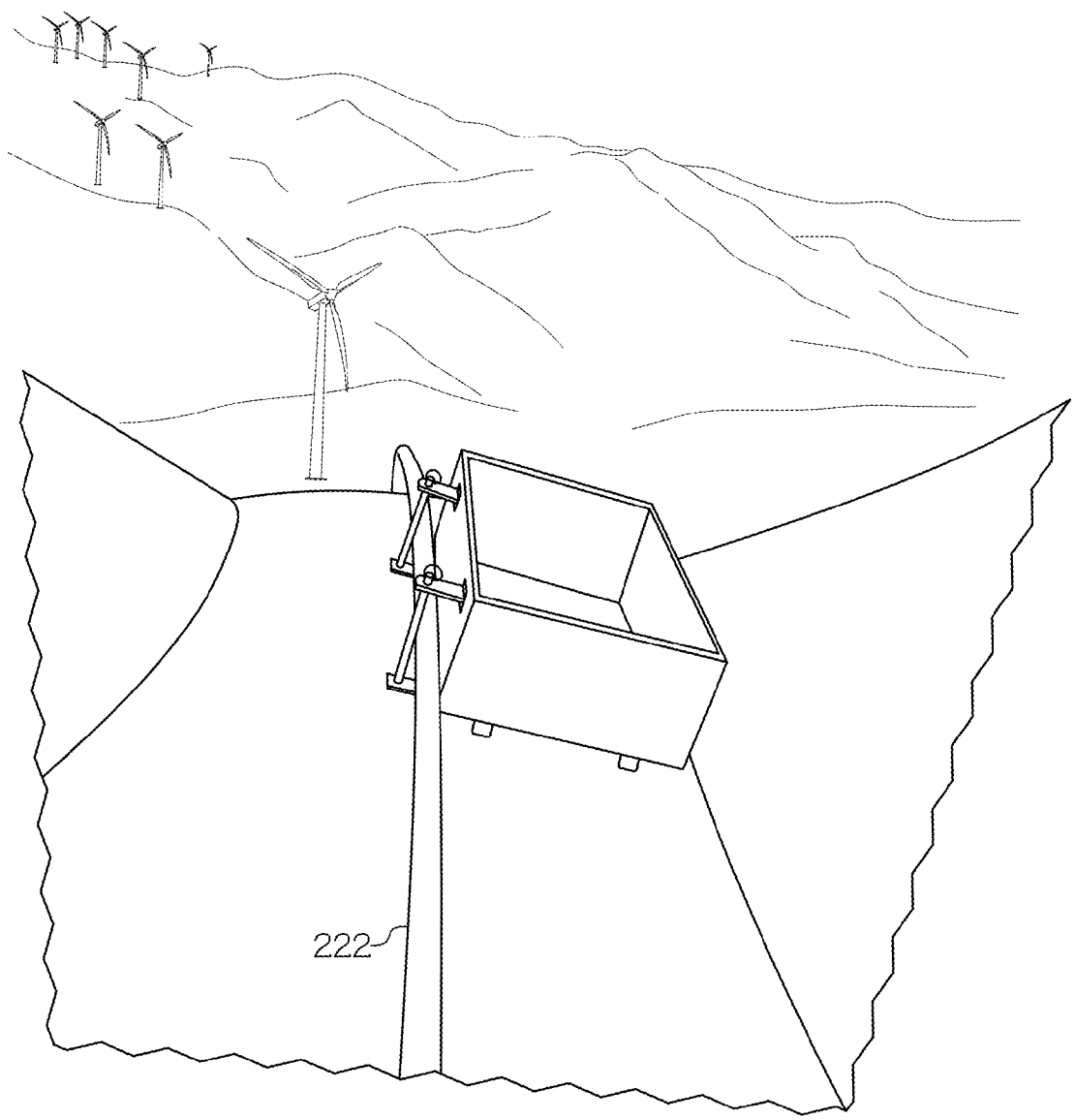
FIG. 8 shows an assembled utility cart, according to an embodiment of the present disclosure.
Figure 13:
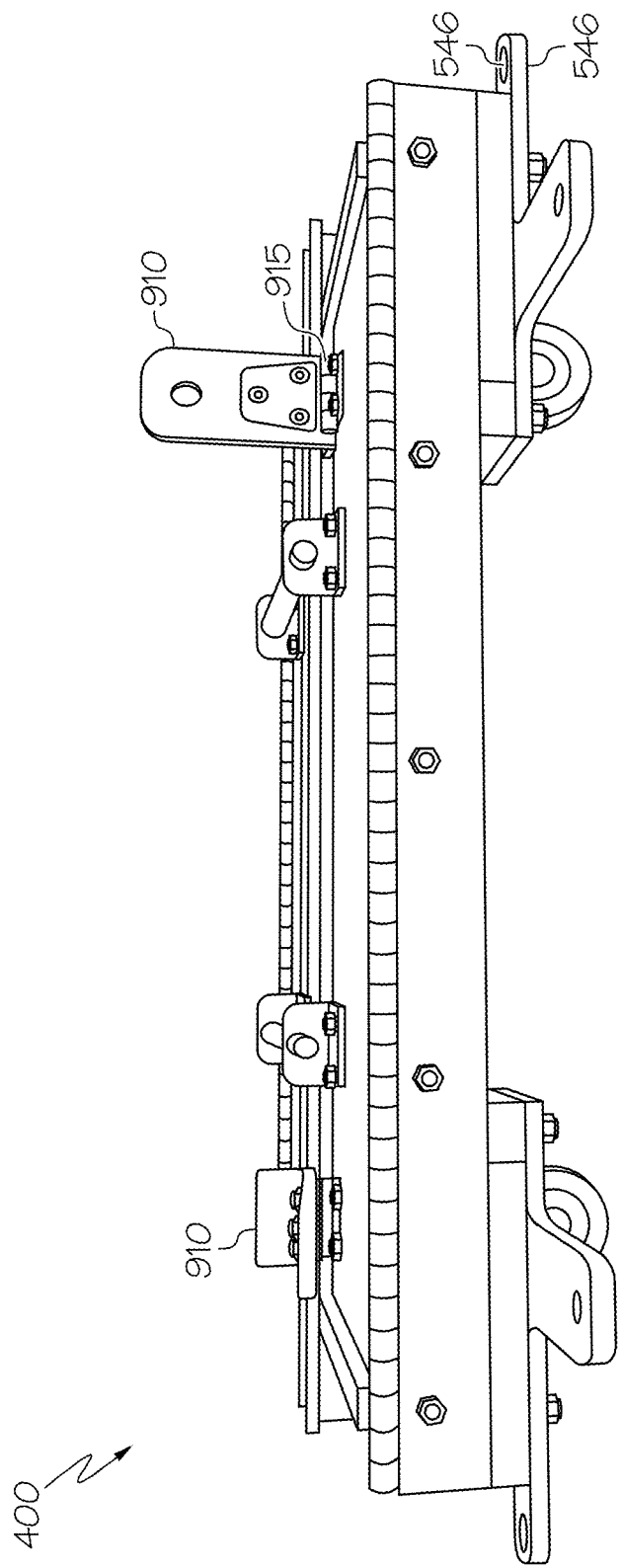
FIG. 13 shows a side view of a fully collapsed utility cart, according to an embodiment of the present disclosure.

In one embodiment, the utility cart 400 measures 26 inches long by 20.5 inches wide by 5 inches high in a fully collapsed state, including wheels. This compact form factor allows the utility cart 400 to be easily stowed for transport where needed. An oblique view of a fully collapsed utility cart 400 with wheels is shown in FIG. 13. In its fully assembled state, an example of which is shown in FIG. 8, the utility cart 400 measures approximately 26 inches long by 20.5 inches wide by 12 inches high. In its fully assembled state, the comparatively large size of the utility cart 400 with respect to the tool bag 240 accommodates more, and heavier, tools and parts. By reducing the number of trips a worker must make up and down the nacelle 120 and across to the hub 140, the utility cart 400 reduces the risk of an injury transporting tools and parts while working on industrial machines, such as wind turbines 100.

According to an embodiment, the utility cart 400 includes: a rigid rectangular base panel 430 and four rigid rectangular walls. The rigid rectangular base panel 430 has a top side, a bottom side, and four peripheral edges. Four walls formed by two side panels 440 and 450 and two end panels 460 and 470 are each pivotally coupled to the base panel 430 by a hinge mechanism, such as the hinge 480 shown in FIG. 4. The two end panels, labeled here as front panel 460 and back panel 470, are shorter in length than the two side panels 440 and 450, and are interchangeable. Each of the side and end panels has an inside surface, an outside surface, two side edges, a lower edge, and an upper edge. Side panels 440 and 450 feature a lip 490 along their upper edge. Each end of the lip 490 forms a tab 492 with an aperture 494 for insertion of a pin to attach one end of the side panel 440 or 450 to one end of an end panel 460 or 470, as shown in FIG. 4. The lip 490 features a side edge 495 at a right angle to the lip.

According to one embodiment, the utility cart 400 is constructed of lightweight aluminum or an aluminum alloy. In addition to being lightweight, the properties of aluminum and aluminum alloys include: good tensile strength, ease of machining, and corrosion resistance. The bottom panel 430 and each of the four wall panels (440, 450, 460, 470) of the utility cart 400 are essentially rectangular aluminum sheets. All edges of the utility cart 400 are rounded off to prevent injury and snagging.

The panels 440, 450, 460 and 470 are interlocked and latched to the base panel 430 at their respective bottom edges by a hinge mechanism such as hinge 480. One length-wise edge of each sheet is pivotally attached to the base panel 430 by a pivotal hinge connection such as, for example, the double-acting piano (continuous) hinge 480 shown in FIG. 4. The hinges 480 allow movement of the panels 440, 450, 460 and 470 so that the panels can be pivoted to an upright position that is perpendicular to the base panel 430. When both side panels 440 and 450 and both end panels 460 and 470 are raised to an upright position perpendicular to the base panel 430, the panels define the boundaries of a rectangular box. Structural integrity is provided when the panels are secured at their respective top edges by pins slotted through the apertures in the tabs 492 in the side panels. The utility cart 400 of FIG. 4 is shown with an end panel 460 collapsed. The plurality of folding side and end panels of the utility cart 400 can all be collapsed, simply by removing the pins from the tabs 492. FIG. 13 shows a side view of a fully collapsed utility cart 400.

Figure 5:
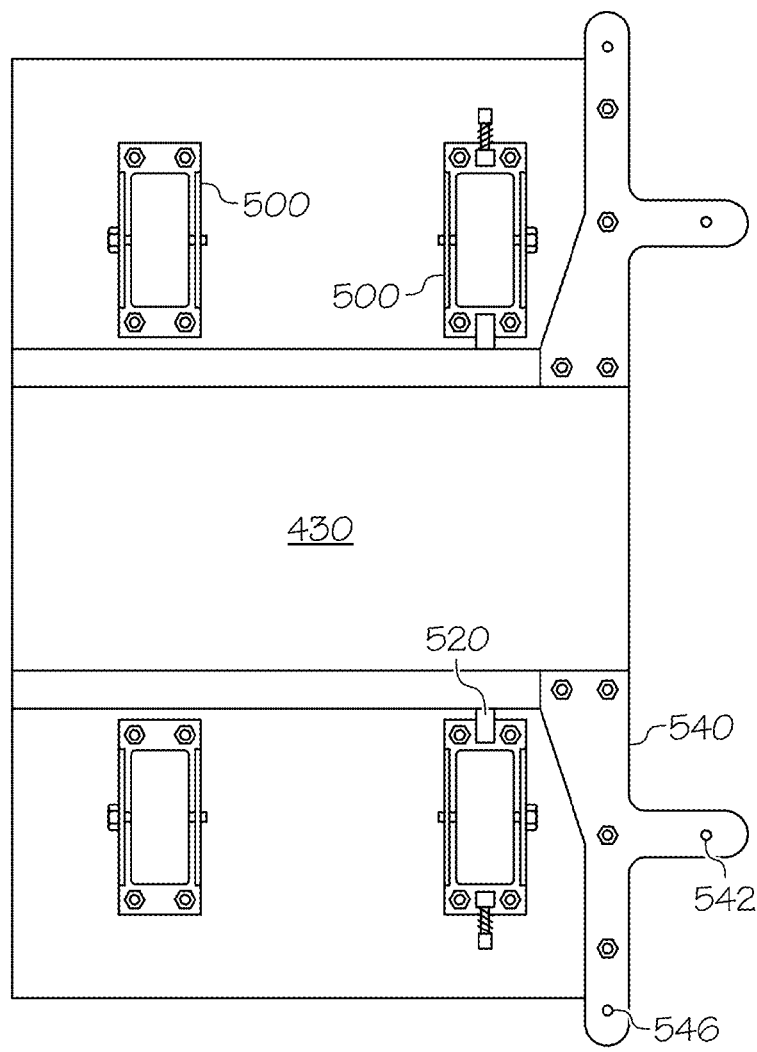
FIG. 5 shows a front view of the undercarriage of the utility cart with wheels attached, according to an embodiment of the present disclosure.
Figure 6:
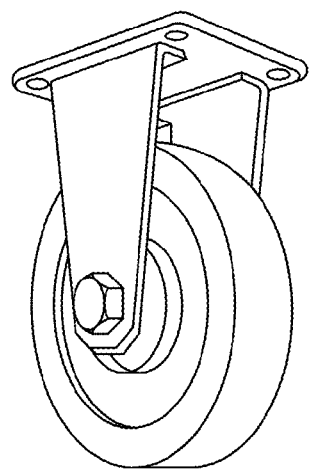
FIG. 6 shows an enlarged view of a wheel, according to an embodiment of the present disclosure.

As shown in FIG. 5, four rotatable wheels 500 are pivotably attached to the bottom side (undercarriage) of the base panel 430. The wheels 500 allow the utility cart 400 to move easily along the nacelle 120 to and from the hub 140. In one embodiment, wheel locks 520 are used to lock the wheels 500, preventing movement of the utility cart 400. FIG. 6 shows an enlarged view of one example of a wheel 500.

Also shown in FIG. 5 are two "L" brackets 540 secured to one lateral side of the bottom panel 430. Each "L" bracket 540 has a tab protruding away from the bottom panel 430. The tabbed edge protruding from the side of the cart 400 has an aperture 542 through which an attachment bar is fitted. The tabbed edge protruding from the end of the bottom panel 430 also has an aperture 546 through which a guide rope can be secured.

Figure 7:
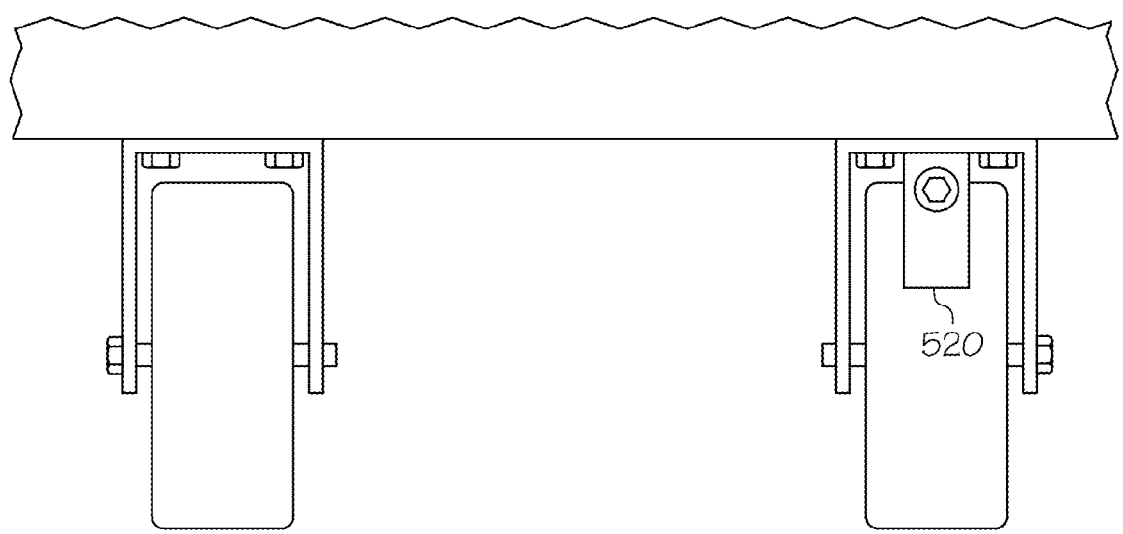
FIG. 7 shows a close-up view of a wheel lock, according to an embodiment of the present disclosure.

FIG. 7 shows a close-up view of the wheel lock 520. When the wheel lock 520 is deployed, the wheels 500 lock until pressure is applied to move the utility cart 400. The pressure sensitivity can be adjusted. In one embodiment, the sensitivity is adjusted by tightening a screw which puts pressure on a plate that exerts force on the wheel 500, keeping the wheel 500 from rotating. This keeps the utility cart 400 from rolling by itself without user engagement.

Figure 9:
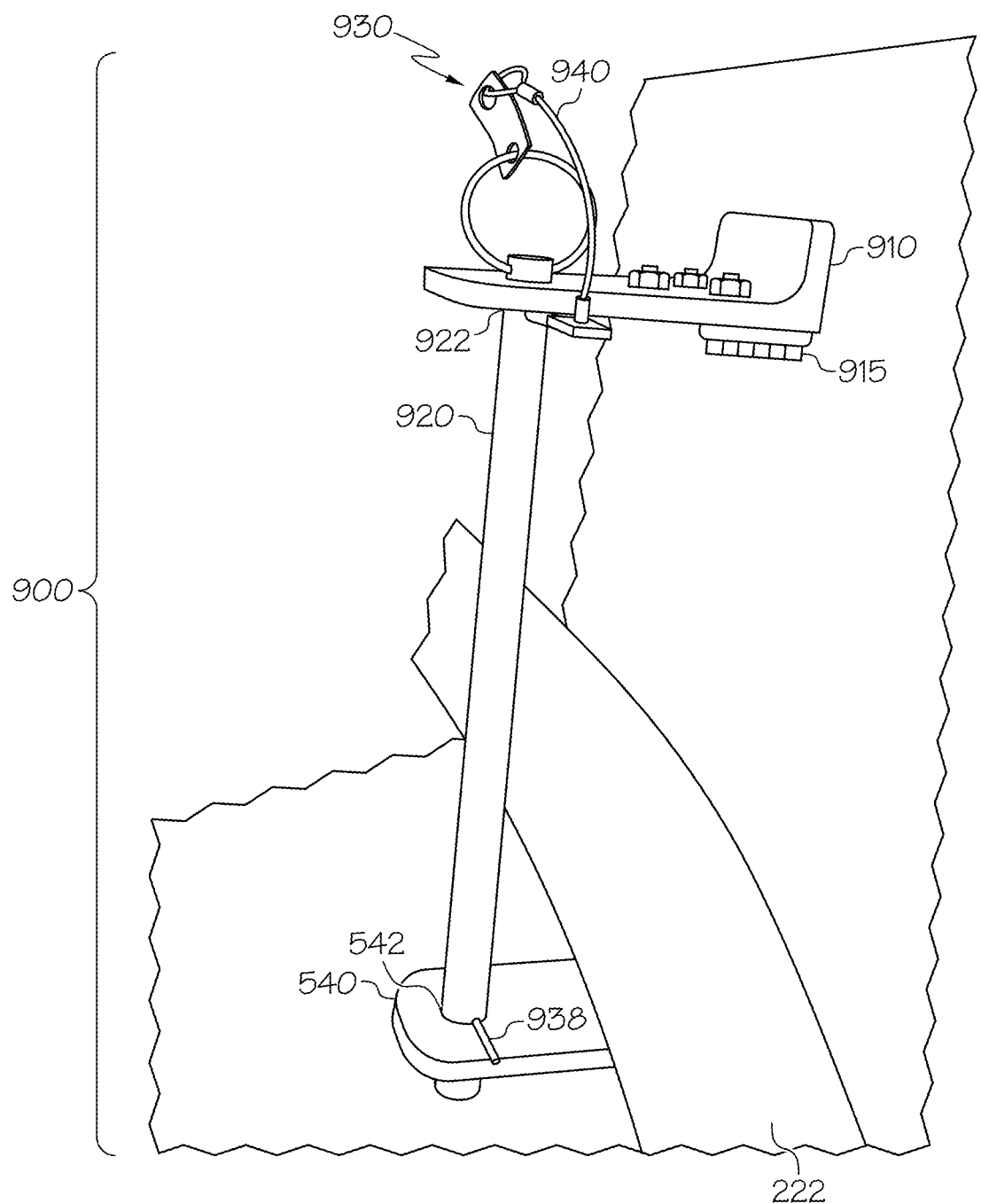
FIG. 9 shows a detailed view of the attachment mechanism securing the utility cart to the safety rail, according to an embodiment of the present disclosure.

FIG. 8 shows a an unfolded and fully assembled utility cart 400 atop the nacelle 120. The utility cart 400 pictured in FIG. 8 is shown rollably secured to the safety rail or guide rail 222 by attachment bars extending from the side panel 440. The utility cart 400 can remain movably secured to the safety rail 222 as it rolls along the nacelle 120 with the aid of a plurality of attachment bars. This configuration facilitates movement of materials or tools contained within the foldable utility cart while secured atop the wind turbine nacelle. FIG. 9 shows a more detailed view of the attachment mechanism 900 securing the utility cart 400 to the safety rail 222. The attachment mechanism 900 serves to secure the utility cart 400 to the safety rail 222, but can also be used to pick up and move the utility cart 400 when not secured to the safety rail 222.

Referring now to FIG. 9, the attachment mechanism 900 securing the utility cart 400 to the safety rail 222 is shown. In FIG. 9, one handle mount 910 is shown pivotally attached to the outside surface of side panel 440. The handle mounts 910 are bolted to the panel 440 with a hinge mechanism 915 such that the handle mounts can be pivotally folded back when not in use. When extended outward, the handle mount 910 ideally will extend outward a sufficient distance to accommodate the width of the safety rail 222. Each handle mount 910 has at least one opening 922. The attachment bar 920 slides through the opening 922 and through the aperture 542 at the end of the "L" bracket 540, effectively securing the utility cart 400 to the safety rail 222. The apertures in the handle mount 910 and the "L" bracket 540 must be in axial alignment so that the attachment bar 920 can easily slide through one opening into the other.

Each attachment bar 920 is kept from sliding completely out of the opening 922 by use of a locking assembly 930. The locking assembly 930 detachably connects the attachment bar 920 to the handle mount 910, securing it in place. The locking assembly 930 can be, for example, a locking ring such as the one depicted in FIG. 9 or a pin 938 such as the pin shown at the bottom of FIG. 9. One with knowledge in the art will appreciate that other types of securing devices can be implemented, within the spirit and scope of the invention. Each of the removable parts of the utility cart 400, such as the attachment bars 920 and locking rings are "captive parts" secured by tethers 940 to the utility cart 400. This is important when opening/closing or locking/unlocking the utility cart 400 so that the parts do not fall or get blown by the wind.

Figure 10:
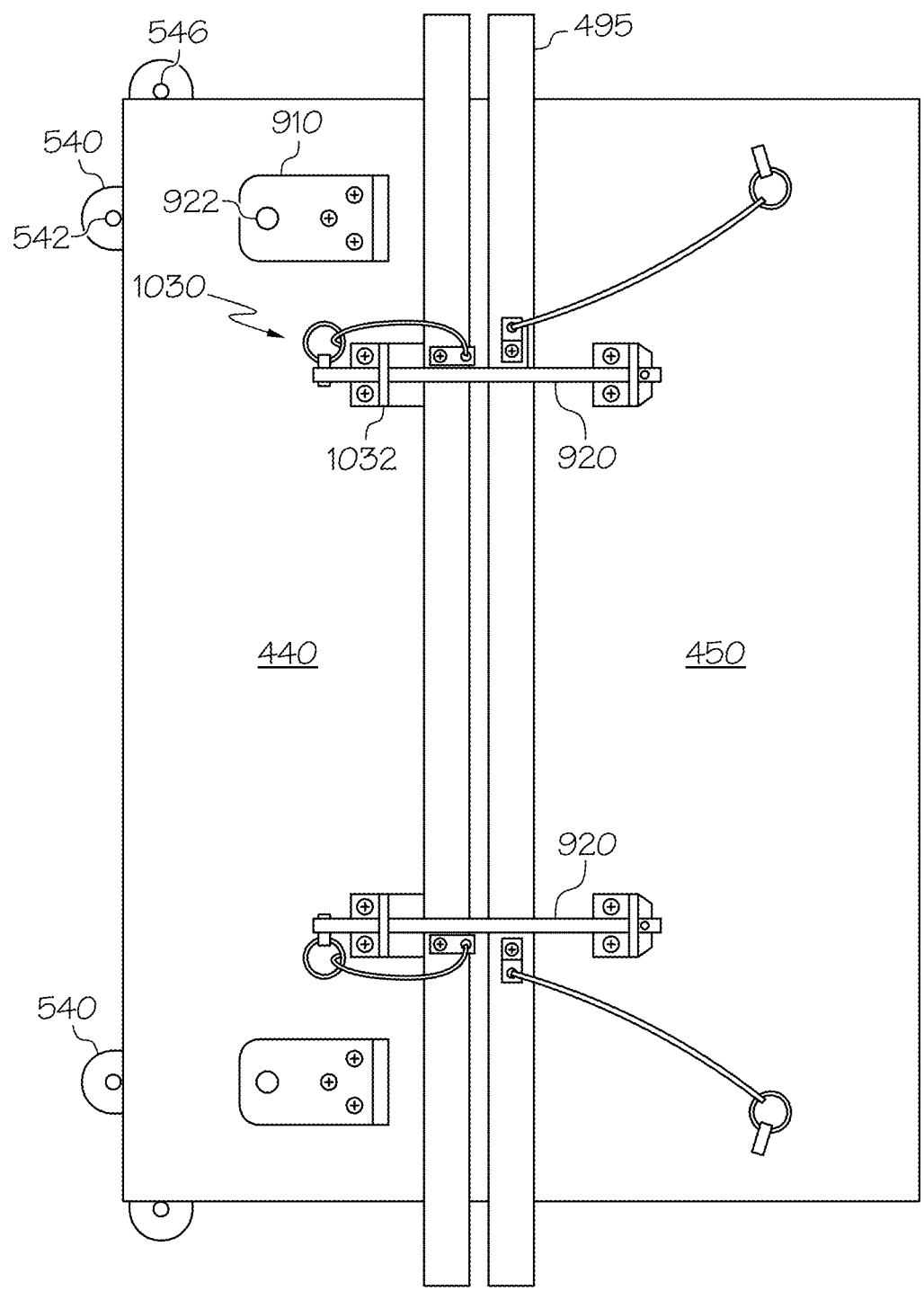
FIG. 10 shows the utility cart side walls in the locked position, according to an embodiment of the present disclosure.
Figure 14:
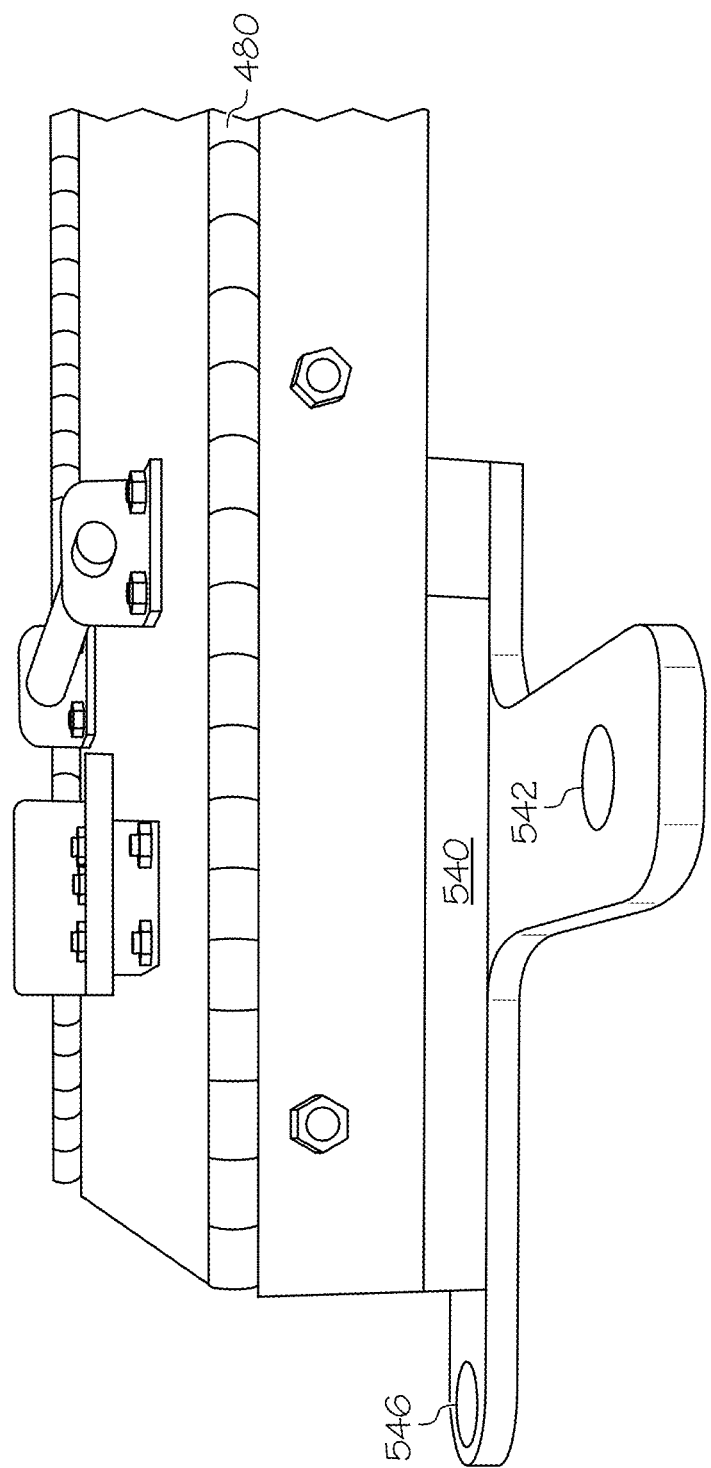
FIG. 14 shows a close-up view of the "L" bracket, according to an embodiment of the present disclosure.

FIG. 10 shows a top view of a fully collapsed utility cart 400. To collapse the utility cart 400, any securing pins are disengaged. Then, the two end panels 460 and 470 (not shown) are folded down to rest upon the bottom panel 430. After the two end panels 460 and 470 are folded, the two side panels 440 and 450 are pivotally folded down towards each other, parallel to the bottom panel 430, such that the side edges 495 of the lip 490 are now fully exposed, side by side and parallel to each other. To keep the panels 440 and 450 from opening when in stowed position, a lock assembly 1030 is used. The lock assembly 1030 is similar to the attachment bar locking assembly 930. Because the lock assembly 1030 is used to brace the panels 440 and 450 and does not need to accommodate the width of a safety rail 222, the bolted mounts 1032 of the lock assembly 1030 are designed to be substantially flush with the cart 400. FIG. 10 also shows the handle mounts 910 laying flat against the side panel 440. The utility cart 400 is considered to be ready to be stowed when the two side panels 440 and 450 are collapsed and secured with the lock assembly 1030 and the handle mounts 910 are in a closed position. FIG. 10 also shows the plurality of removable bars 920 being used for securing the plurality of panels 440 and 450 in the collapsed state. Referring back to FIG. 8 and FIG. 9, the plurality of removable bars 920 are also used for movably securing the foldable utility cart to the guide rail in an assembled state. FIG. 14 shows a close-in view of the compactness of the handle mounts 910 and lock assembly 1030 when in the stowed position.

Figure 11:
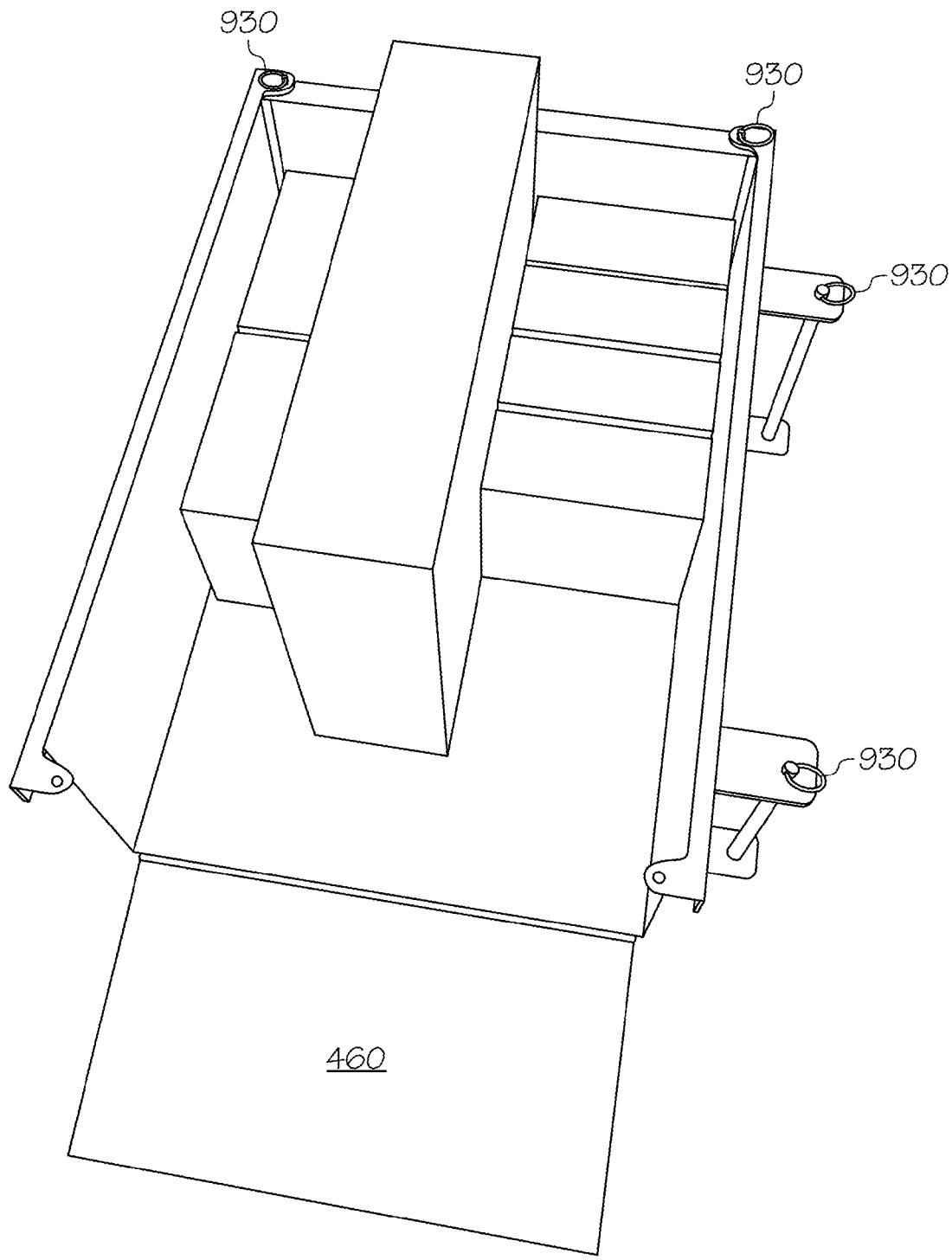
FIG. 11 shows an assembled utility cart with a load of tools, according to an embodiment of the present disclosure.

FIG. 11 shows a partially assembled utility cart 400 with the front panel 460 down, in the process of being loaded. Note how the front panel 460 can easily collapse to form a ramp for easier loading. For loading larger items, a side panel can be brought down instead. FIG. 11 also shows how the locking mechanisms 930 used in the attachment bars 920 can be the same locking mechanisms 930 used to hold the panels in place.

Figure 12:
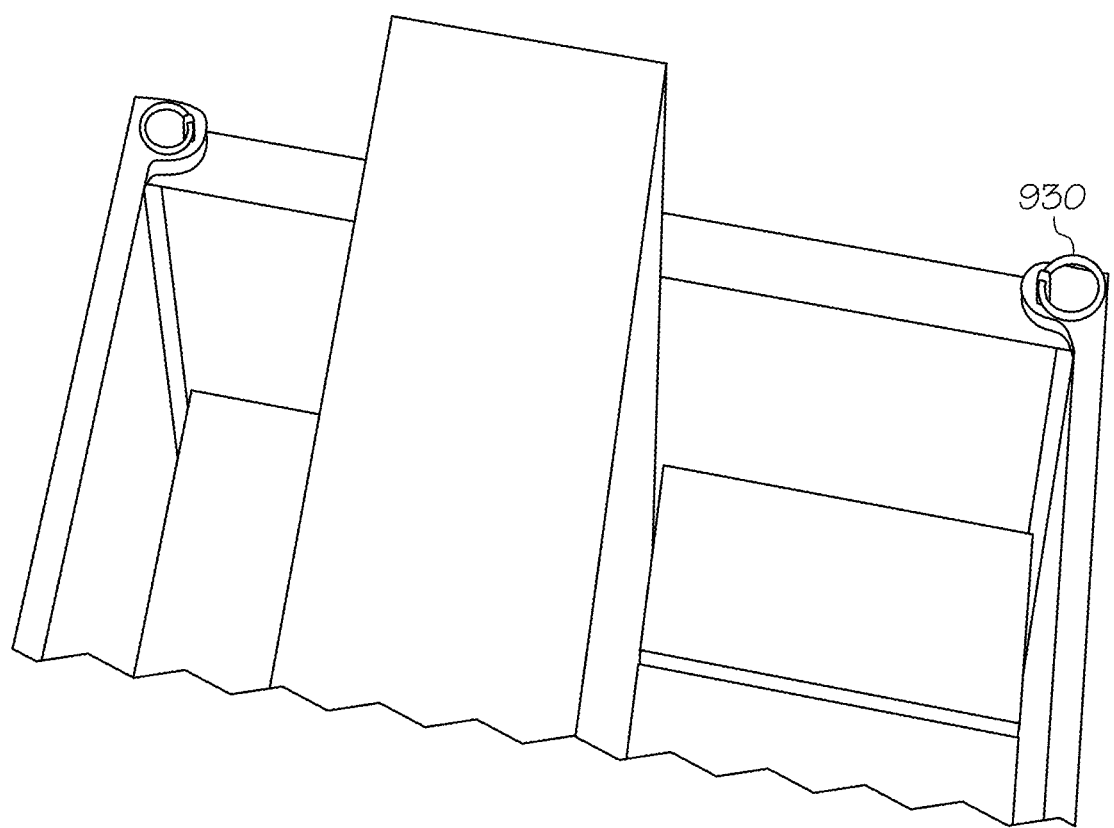
FIG. 12 shows up a close-up view of the pin clips used to secure the utility cart walls, according to an embodiment of the present disclosure.

FIG. 12 shows a close-up view of the attachment mechanism 930 used for removably attaching the side panels to the end panels. In an embodiment, the attachment mechanism 930 is, for example, a locking pin with a ring such as that shown in FIG. 12. The advantage of using locking pins is that they are easily removed without tools. The end of each locking pin has an eye through which a ring is engaged. The ring is of a sufficient size that it can be easily grasped by a worker wearing thick gloves.

FIG. 13 shows an oblique view of the utility cart 400 in a stowed (collapsed) position, according to an embodiment of the present disclosure. As FIG. 13 shows, the side panels have been folded in and over the end panels. In its collapsed state, the utility cart 400 can be easily transported up a passageway internal to the tower 110. Upper handle mount 910 is shown in an extended position, while lower handle mount 910 is shown in a stowed position. The handle mounts 910 pivot on hinges 915.

Figure 15:
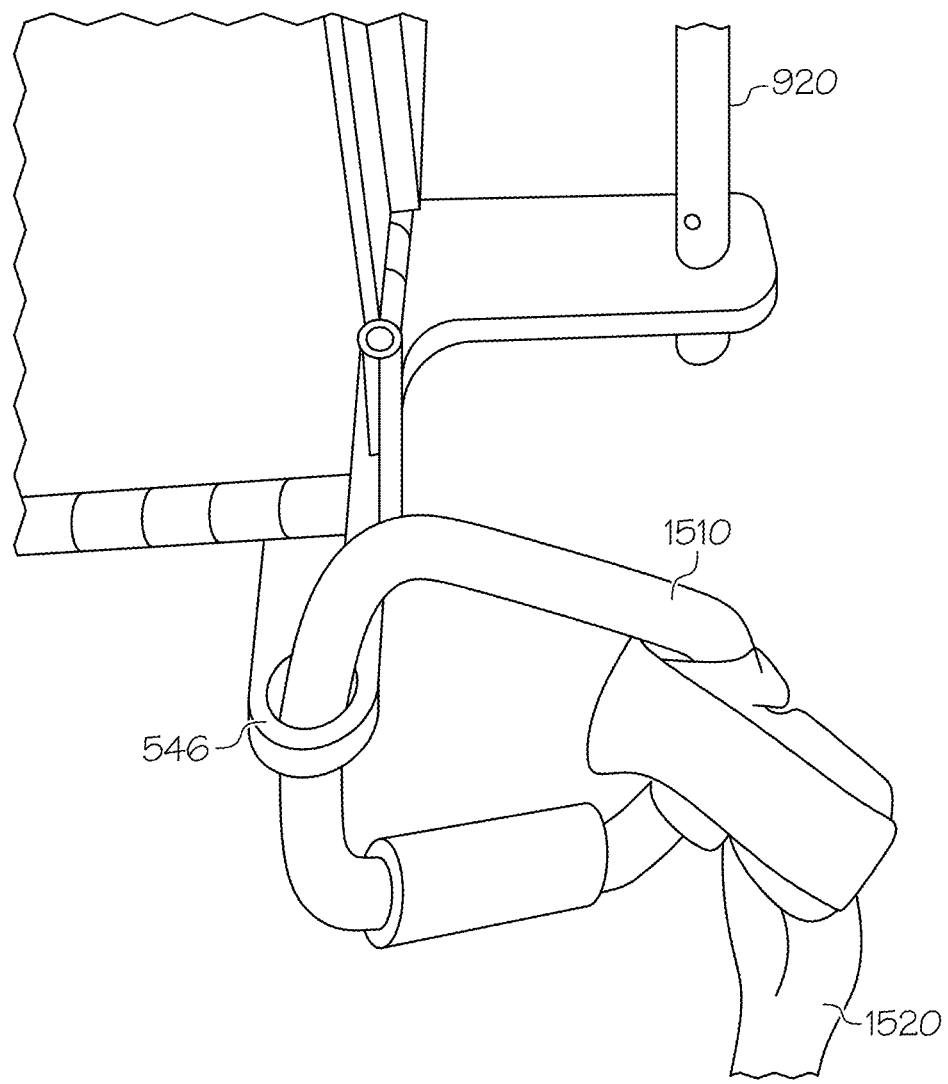
FIG. 15 shows a view of a partially assembled utility cart with a carabiner through the "L" bracket, according to an embodiment of the present disclosure.

FIG. 14 is a close-up view of the "L" bracket 540, showing the aperture 542 used for engagement of the attachment bar 920, and the aperture 546 used for attaching a rope or strap. FIG. 15 shows another close-up view of the "L" bracket 540 with a carabiner 1510 disposed through aperture 546. Carabiner 1510 is attached to a rope or strap 1520. This tie-off point is used for maintaining the utility cart 400 in place when the cart 400 is on the nose cone 145 and has not yet been engaged to the safety rail 222. A portion of attachment bar 920 is also shown in FIG. 15.

Figure 16:
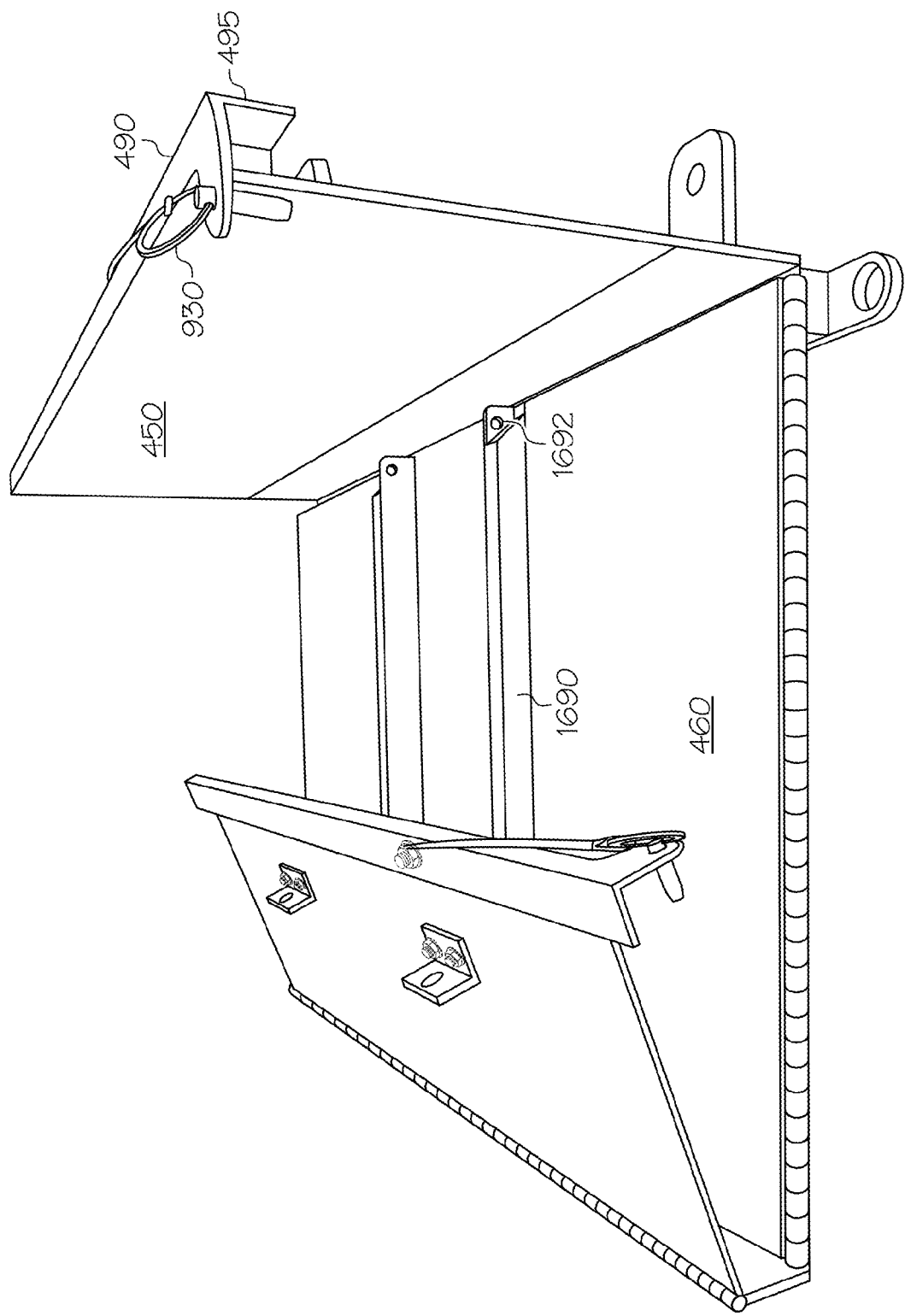
FIG. 16 shows an oblique view of a partially assembled utility cart, according to an embodiment of the present disclosure.

FIG. 16 is an illustration of the utility cart 400 in the process of being assembled from a fully collapsed position. From a fully collapsed stated, first the side panels 440 and 450 are unlocked and pivotally swung "open." Once the side panels 440 and 450 have been opened, the two end panels 460 and 470 can be opened. When the panels are pivoted to a position perpendicular to the base panel 430, the lip edges 490 of the side panels 440 and 450 will extend over the edges 490 of the front and end panels 460 and 470 such that the apertures 494 in the tabs 492 of the side panels 440 and 450 align with the apertures 1692 at the ends of the lip edge 1690 of the end panels 460 and 470. Finally, locking pins 930 are engaged through the tab apertures 494 of the side panels 440 and 450 and the apertures 1692 of the end panels 460 and 470 to maintain the structural integrity of the cart 400.

Figure 17:
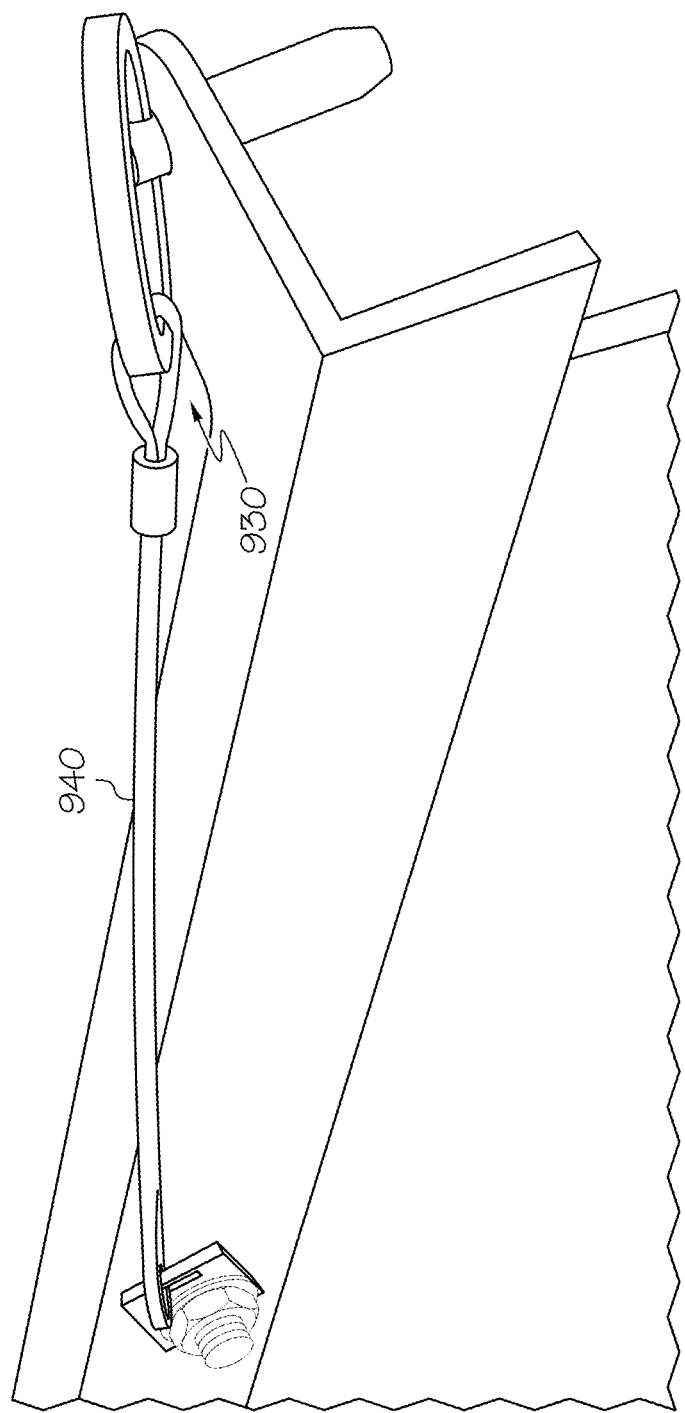
FIG. 17 shows a close-up view of the lipped edge with a pin-clip fastener, according to an embodiment of the present disclosure.

FIG. 17 shows how the captive parts can be tethered to the utility cart 400. For example, in FIG. 17 the locking mechanism 930 is secured to the cart 400 by a tether 940 bolted to a panel. FIG. 18 shows a different view of the captive parts of the utility cart 400, such as the locking mechanism 930 secured to the cart 400 with a tether 940. In this example, the tether 940 is secured to the cart 400 using a bolted tab 1810.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A foldable utility cart comprising:
a rigid rectangular base with a top side, a bottom side, and four peripheral edges;
at least one bracket affixed to the bottom side of the rigid rectangular base, the at least one bracket positioned to extend beyond the rigid rectangular base with a first portion extending beyond a lateral side of the rigid rectangular base, the first portion comprising a first opening;
a set of four rotatable wheels pivotably attached to the bottom side of the rigid rectangular base;
four side walls defined by a front wall, a rear wall, a right wall, and a left wall, both the front wall and the rear wall being shorter in length than both the right wall and the left wall, and each of the four side walls with an inside surface, an outside surface, a lower edge, two side edges, and a top lip;
wherein each lateral end of the top lip of the right wall and the left wall ends in a tab with a second opening therethrough;
wherein each lateral end of the top lip of the rear wall and the front wall ends in a rounded edge with a third opening therethrough;
a hinge assembly pivotably coupling each of the four side walls to a peripheral edge of the rigid rectangular base, whereby the hinge assembly provides for each of the four side walls, at least
a first position being substantially perpendicular to the rigid rectangular base and defining a rectangular storage volume delineated by the top side of the rigid rectangular base and the inside surface of each of the four side walls; and
a second position, in which the inside surface of the front wall and the rear wall are substantially parallel to the top side of the rigid rectangular base and rest thereupon, and the inside surface of the right wall and the left wall are substantially parallel to the outside of the front wall and rear wall and rest thereupon;
at least one foldable handle mount attached to the outside surface of one of the right wall and the left wall, the at least one foldable handle mount with a fourth opening therethrough;
wherein, when the at least one foldable handle mount is fully extended, the fourth opening is in axial alignment with the first opening of the at least one bracket;
a first cylindrical bar sized to slidably fit within and through the fourth opening of the at least one foldable handle mount when fully extended and the first opening of the at least one bracket;
wherein when the foldable utility cart is placed along a safety rail, inserting the first cylindrical bar through the first and fourth openings secure the foldable utility cart to the safety rail;
a locking clip disposed through an end of the first cylindrical bar, the locking clip maintaining the first cylindrical bar in place when disposed through the first and fourth openings, wherein the locking clip is secured to the foldable utility cart by a tether; and
at least two carrying handle mounts attached on the outside surface of each of the right wall and the left wall, each of the handle mounts with at least one opening therethrough through which a second cylindrical bar slidably fits, thereby securing the foldable utility cart in a fully collapsed state when in the second position.

2. The foldable utility cart of claim 1 further comprising a movable wheel lock attached to at least one of the set of the four rotatable wheels, wherein engaging the movable wheel lock prevents rotation of the four rotatable wheels.

3. The foldable utility cart of claim 2 wherein the movable wheel locks are pressure-sensitive.

4. The foldable utility cart of claim 1 wherein the rigid rectangular base and the four side walls are constructed from a non-corrosive, lightweight material.

5. The foldable utility cart of claim 4 wherein the rigid rectangular base and the four side walls are constructed from an aluminum alloy.

6. The foldable utility cart of claim 4 wherein the rigid rectangular base and the four side walls are constructed from aluminum.

7. The foldable utility cart of claim 1 further comprising a pin lock assembly comprising a pin slidably disposed through the second opening and the third opening, thereby providing structural integrity when the foldable utility cart is in the first position.

8. The foldable utility cart of claim 1 wherein the at least one bracket comprises a second portion extending beyond an end of the rigid rectangular base, the second portion comprising a fifth opening for securing an attachment means.

9. The foldable utility cart of claim 1 wherein the first and second cylindrical bars, pins, and locking clips are captive parts secured to the foldable utility cart by tethers.

10. The foldable utility cart of claim 1 wherein all edges of the foldable utility cart are blunted.

11. The foldable utility cart of claim 1 wherein the foldable handle mounts comprise a hinge allowing folding of the foldable handle mounts for stowing the foldable utility cart.

12. A method for a rolling foldable utility cart comprising a base panel, four sidewall panels, a set of wheels, and a securing mechanism, the method comprising:
collapsing the foldable utility cart for transport to a designated location;
assembling the foldable utility cart at the designated location by
pivoting each of the four sidewall panels to a position perpendicular to the base panel;
securing the four sidewall panels in place with pins tethered to the foldable utility cart; and
applying the securing mechanism to the foldable utility cart; and
rollably securing the assembled foldable utility cart to a guide rail by extending at least one foldable handle mount attached to one of the four sidewall panels along a guidance rail; and
inserting a first cylindrical bar through an opening in the at least one foldable handle mount, over the guidance rail, and through a first opening in at least one bracket attached to the base panel, thereby securing the foldable utility cart to the guidance rail.

13. The method of claim 12 wherein collapsing the foldable utility cart comprises:
removing the first cylindrical bar;
folding the at least one foldable handle mount;
removing the pins from the four sidewall panels;
collapsing the four sidewall panels by:
collapsing a front panel and an end panel inwards over the base panel; and collapsing a left side panel and a right side panel inwards; and securing the left side panel and the right side panel with a second cylindrical bar.

14. The method of claim 13 further comprising securing the first and second cylindrical bars to the foldable utility cart with tethers.

15. The method of claim 12 wherein rollably securing the foldable utility cart in an assembled state to the guide rail further comprises attaching a strap to a second opening in the at least one bracket attached to the base panel.

16. The method of claim 12 further comprising securing collapsed foldable utility cart in a collapsed state for transport to the designated location using a plurality of removable bars;

and securing the foldable utility cart in an assembled state to the guide rail after transport to the designated location using the plurality of removable bars.

17. The method of claim 16 wherein the designated location is a top of a nacelle of a wind turbine and the transport to the designated location includes transporting the foldable utility cart in the collapsed state up a passageway internal to a tower of the wind turbine.

18. A foldable utility cart for moving materials atop a wind turbine nacelle having a guide rail for securing human movement atop the wind turbine nacelle, the foldable utility cart comprising:

a plurality of folding panels for presenting a collapsed state for facilitating transportation through a passageway internal to a tower to a top of the wind turbine nacelle and for presenting an assembled state while unfolded for facilitating movement of materials contained within the foldable utility cart while secured atop the wind turbine nacelle; and a plurality of removable bars for securing the plurality of folding panels in a collapsed state and for movably securing the foldable utility cart to the guide rail in an assembled state.

19. The foldable utility cart of claim 18, further comprising:

a set of four rotatable wheels pivotably attached to a bottom side of the foldable utility cart.

20. The foldable utility cart of claim 18, wherein the plurality of folding panels are four and the plurality of removable bars is two.

* * * * *